ns Patent Office
3,231,603
Patented Jan. 25, 1966

3,231,603
PREPARATION OF UNSYMMETRICALLY HALOGENATED BISPHENOLS AND ESTERS THEREOF
Henry E. Hennis and Leonard R. Thompson, Midland, Mich., assignors to The Dow Chemical Company, Midland, Mich., a corporation of Delaware
No Drawing. Filed July 3, 1963, Ser. No. 292,752
4 Claims. (Cl. 260—479)

This invention is concerned with a process for making chemical compounds and with new compounds thereby prepared. This process is a new and convenient method for making monohalogenated and unsymmetrically dihalogenated derivatives of alkylidenebisphenols.

The halogenated bisphenols obtainable through this process have the formula

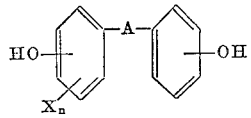

wherein A is a divalent alkylidene radical such as methylene, isopropylidene, butylidene, cyclohexylidene, and benzylidene, X is a middle halogen atom, i.e., chlorine or bromine, and n is an integer from one to two. The mono and diesters of these bisphenols with lower alkanoic acids are also easily prepared by means of this process. These esters have one of the formulas

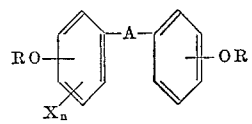

and

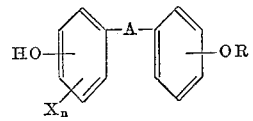

in which R represents a lower acyl radical of one to about four carbon atoms and X, n, and A are as defined above.

Bisphenols and bisphenol derivatives having halogen atoms substituted on only one of the two aromatic rings of the bisphenol nucleus are not readily made by the usual methods of synthesis. When a bisphenol is directly brominated or chlorinated, both aromatic rings are attacked with equal speed and the only pure compounds which can be separated from the reaction mixture are the symmetrically dihalogenated or tetrahalogenated compounds, depending upon the amount of halogen employed. A few unsymmetrically halogenated bisphenols have been made by specialized and indirect methods of synthesis which are not applicable to bisphenols in general.

It has now been found that such unsymmetrically halogenated bisphenol compounds can be obtained easily and in good yield by halogenating the monester of an alkylidene bisphenol with a lower alkanoic acid, using about one or about two moles of halogen per mole of bisphenol monoester depending on whether the monohalo or dihalo compound is desired. The ester group can then be removed from the halogenated molecule by conventional hydrolysis to obtain the halogenated bisphenol itself.

The halogenation is necessarily carried out under substantially anhydrous conditions to avoid hydrolysis of the ester group and consequent loss of selective reaction. Other conditions of the halogenation reaction are those conventional for halogenation of bisphenols. The reaction is carried out in inert solvent solution at a temperature sufficiently low to avoid side reactions and formation of colored by products. Temperatures of about 0–50° C. are suitable and normal room temperature is preferred. By the term inert solvent is meant any organic solvent which is unreactive in the process. Suitable solvents include halogenated hydrocarbons such as carbon tetrachloride, chloroform, ethylene dichloride, and tetrachloroethane, and aliphatic or cycloaliphatic hydrocarbons such as hexane, cyclohexane, petroleum ether, and the like.

Hydrolysis of the halogenated bisphenol ester to obtain the halogenated bisphenol is by conventional means. Mere contact with warm aqueous sodium hydroxide or an equivalent base is sufficient.

Preparation of the bisphenol monoester starting material requires special methods. A convenient synthesis of such monoesters involves a partial hydrolysis of the easily made bisphenol diester by reaction with an equal molar proportion of a lower alkanol under anhydrous conditions and in the presence of a small quantity of an alkali metal lower alkoxide. This method is the subject of our copending application, Serial No. 292,770, concurrently filed herewith. Example 1 is illustrative of this process.

Example 1

A solution of 75 g. of p,p'-isopropylidenediphenol diacetate in 150 ml. of dry toluene was heated to reflux temperature in a reaction flask equipped with a stirrer, a reflux condenser, and a dropping funnel. To the refluxing solution there was added dropwise a solution of 0.45 g. of sodium methoxide in 7.7 g. of methanol over a period of 20 minutes. The reaction mixture was stirred for an additional 1.5 hours at the reflux temperature, then it was cooled to room temperature and the sodium salts present were neutralized by bubbling through excess carbon dioxide. Precipitated sodium carbonate was removed by filtration and solvent was separated by distillation at 25 mm. Hg absolute to a pot temperature of 85° C. The viscous residue thereby obtained was dissolved in 45 ml. of carbon tetrachloride and this solution was chromatographed over finely divided activated alumina. The components of the solution were eluted with methylene chloride, a small amount of the diacetate being the first compound eluted and the monoacetate followed. The bisphenol present remained in the alumina. The monoacetate was recrystallized from a mixture of 45 ml. of perchloroethylene and 25 ml. of petroleum ether, thereby yielding 16.4 g. of white, crystalline product, M.P. 100–102° C. The identity of this product as p,p'-isopropylidenediphenol monoacetate was confirmed, by elemental analysis.

By this same procedure the monoesters of other alkylidenebisphenols with lower alkanoic acids are prepared from the corresponding diesters. Other alkali metal alkoxides such as potassium methoxide, sodium isopropoxide, and lithium ethoxide are equivalent in the process to the sodium methoxide used in Example 1. Similarly anhydrous ethyl alcohol or propyl alcohol can be used in place of methyl alcohol under the same reaction conditions.

Example 2 illustrates the process whereby an unsymmetrically dihalogenated bisphenol is prepared by halogenation of the bisphenol monoester.

*Example 2*

A solution of 4.0 g. of p,p'-isopropylidenediphenol monoacetate in 30 ml. of chloroform was cooled to 10° C. and a solution of 4.76 g. of bromine in 20 ml. of chloroform was added to it dropwise with good agitation. After the addition was complete, the chloroform solvent was removed from the reaction mixture by evaporation and the oily residue which was essentially α-(3,5-dibromo-4-hydroxyphenyl)-p-cumenyl acetate was dissolved in 40 g. of 5% aqueous sodium hydroxide. Gentle warming was required to obtain complete solution which indicated completion of the ester hydrolysis. The solution was combined with 100 ml. of carbon tetrachloride and the mixture was acidified to pH 6 by the addition of 5% hydrochloric acid. The organic and aqueous layers were separated and the organic layer was washed with water and then diluted with 50 ml. of petroleum ether. The white crystals which separated from the cold solution were collected and dried to obtain 4.0 g. of 2,6-dibromo-4,4'-isopropylidenediphenol, M.P. 134–135° C. Elemental analysis of this product and a mixed melting point determination with the known 4,4'-isopropylidenebis(2-bromophenol) confirmed its identity as the unsymmetrically dibrominated compound named above. Elemental analysis showed 46.70% carbon, 3.65% hydrogen; calculated values are 46.67% carbon and 3.65% hydrogen.

As a further proof of structure, some of the product was converted to the diacetate by reaction with acetic anhydride. The crude diester was recrystallized from a toluene-petroleum ether mixture to obtain pure white crystals of 2,6-dibromo-4,4'-isopropylidenediphenol diacetate, M.P. 117–118° C. This structure was also confirmed by elemental analysis.

By the same procedure but using less halogen, the monobrominated bisphenol and its mono- and diesterified derivatives are easily obtained. This is shown in Example 3.

*Example 3*

A solution of 4.0 g. of p,p'-isopropylidenediphenol monoacetate in 30 ml. of chloroform was brominated at 10° C. by dropwise addition of an equal molar proportion (2.38 g.) of bromine dissolved in 20 ml. of chloroform. Reaction was substantially instantaneous. After the addition was complete, the chloroform was removed by evaporation from the reaction mixture, leaving an oily residue of α-(3-bromo-4-hydroxyphenyl)-p-cumenyl acetate. This residue was dissolved in 40 g. of 5% aqueous sodium hydroxide with gentle warming. The solution was then saturated with carbon dioxide gas and the gummy crystals which separated during carbonation were collected by filtration. These were dissolved in tetrachloroethylene and undissolved inorganic material was removed by filtration. The filtered solution was allowed to evaporate slowly, whereupon white crystals began to form in the concentrated liquor. Filtration yielded 2.0 g. of 2-bromo-4,4'-isopropylidenediphenol, a white, crystalline compound, M.P. 82–85° C. Elemental analysis showed 59.18% carbon and 4.53% hydrogen, calculated values are 58.65% carbon and 4.92% hydrogen. Further bromination of this compound yielded 4,4'-isopropylidenebis(2,6-dibromophenol).

Some of the 2-bromo-4,4'-isopropylidenediphenol was heated with excess acetic anhydride and a catalytic quantity of p-toluenesulfonic acid at reflux temperature. After removal of excess acetic anhydride, the reaction product was allowed to solidfy into a crystalline mass which was then recrystallized from a toluene-petroleum ether mixture to obtain white crystals of 2-bromo-4,4'-isopropylidenediphenol diacetate, M.P. 82–83° C. The identity of the product was confirmed by elemental analysis.

In the same way as shown in the above examples, other unsymmetrically chlorinated and brominated alkylidenebisphenols and their mono and di esters with lower alkanoic acids are obtained. Illustrative of these compounds are 2-chloro-4,4'-isopropylidenediphenol, 2-bromo-6-chloro-4,4'-isopropylidenediphenol, 2,6-dibromo-4,4'-sec-butylidenediphenol, 4,6-dibromo-2,2'-methylenediphenol, and the mono and di lower alkanoates of these.

These halogenated phenols and their lower alkanoate esters are useful additives which impart fire resistance and other valuable properties to cellulose acetate, polyvinyl chloride, and similar polymeric resins when incorporated therein according to conventional procedures.

The compounds which are derivatives of p,p'-isopropylidenediphenol are particularly useful as inhibitors of bacterial and fungal growth. While 2-bromo-4,4'-isopropylidenediphenol, 2,6-dibromo-4,4'-isopropylidenediphenol, their chlorine analogs, and the mono and di lower alkanoates of these are all useful inhibitors of microbial growth in general, their properties differ in regard to individual organisms. For example, 2-bromo-4,4'-isopropylidenediphenol is particularly active against *Staphylococcus aureus* and *Salmonella typhosa* at concentration levels of the order of 500 parts per million where the higher brominated compounds are ineffective. Similarly, the unsymmetrical dibrominated compound, i.e., 2,6-dibromo-4,4'-isopropylidenediphenol is useful in the control of bean rust when applied in 300 p.p.m. as an aqueous dispersion whereas the known symmetrical compound, 4,4'-isopropylidenebis(2-bromophenol) is without effect under these conditions.

We claim:
1. A process for unsymmetrically halogenating an alkylidenebisphenol nucleus, which process comprises reacting by contacting the lower alkanoic acid monoester of a bisphenol having the formula

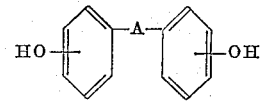

wherein A is selected from the group consisting of alkylidene of 1–4 carbon atoms, cyclohexylidene, and benzylidene with about one to about two molar proportions of a middle halogen in substantially anhydrous inert solvent solution at a temperature of about 0° C. to about 50° C.

2. A process for making unsymmetrically brominated p,p'-isopropylidenediphenol compounds, which process comprises reacting by contacting p,p'-isopropylidenediphenol monoacetate with about one to about two molar proportions of bromine in substantially anhydrous inert solvent solution at about 0° C. to about 50° C.

3. A process for making 2-bromo-4,4'-isopropylidenediphenol which comprises reacting by contacting a mole of p,p'-isopropylidenediphenol monoacetate with about one mole of bromine in substantially anhydrous inert solvent solution at 0–50° C., hydrolyzing the brominated product, and separating 2-bromo-4,4'-isopropylidenediphenol from the hydrolyzed product.

4. A process for making 2,6-dibromo-4,4'-isopropylidenediphenol which comprises reacting by contacting a mole of p,p'-isopropylidenediphenol monoacetate with about two moles of bromine in substantially anhydrous inert solvent solution at 0–50° C., hydrolyzing the brominated product, and separating 2,6-dibromo-4,4'-isopropylidenediphenol from the hydrolyzed product.

References Cited by the Examiner
UNITED STATES PATENTS

| | | | |
|---|---|---|---|
| 2,733,273 | 1/1956 | Rigterink | 260—479 |
| 2,968,673 | 1/1961 | Pursglove | 260—479 |
| 3,035,098 | 5/1962 | Bryner | 260—619 |

OTHER REFERENCES

Fieser and Fieser, Organic Chemistry, 3rd edition, Rheinhold Publishing Corp., New York (1956), pp. 566–567.

Gould, Mechanisms and Structure in Organic Chemistry, Holt, Rinehart and Winston, New York (1959), pp. 212–221 and 226.

Marsh et al., Industrial and Engineering Chemistry, vol. 38, pp. 701–705 (1946).

LORRAINE A. WEINBERGER, *Primary Examiner.*